Figure 22:
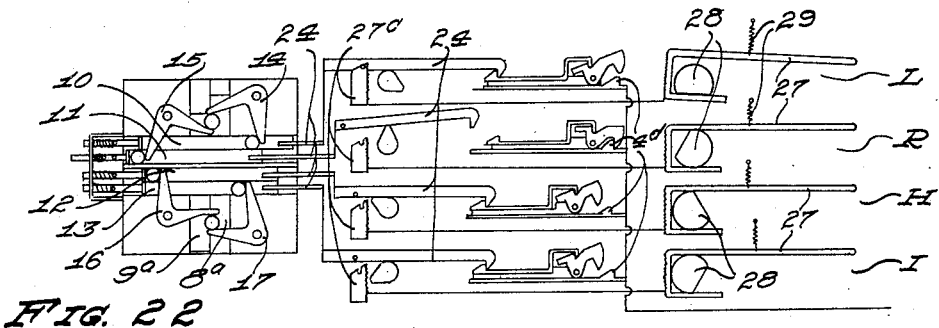

March 11, 1930.  O. E. MARK  1,750,236
GEAR SHIFTING MECHANISM FOR POWER TRANSMISSIONS
Filed May 21, 1928  6 Sheets-Sheet 1
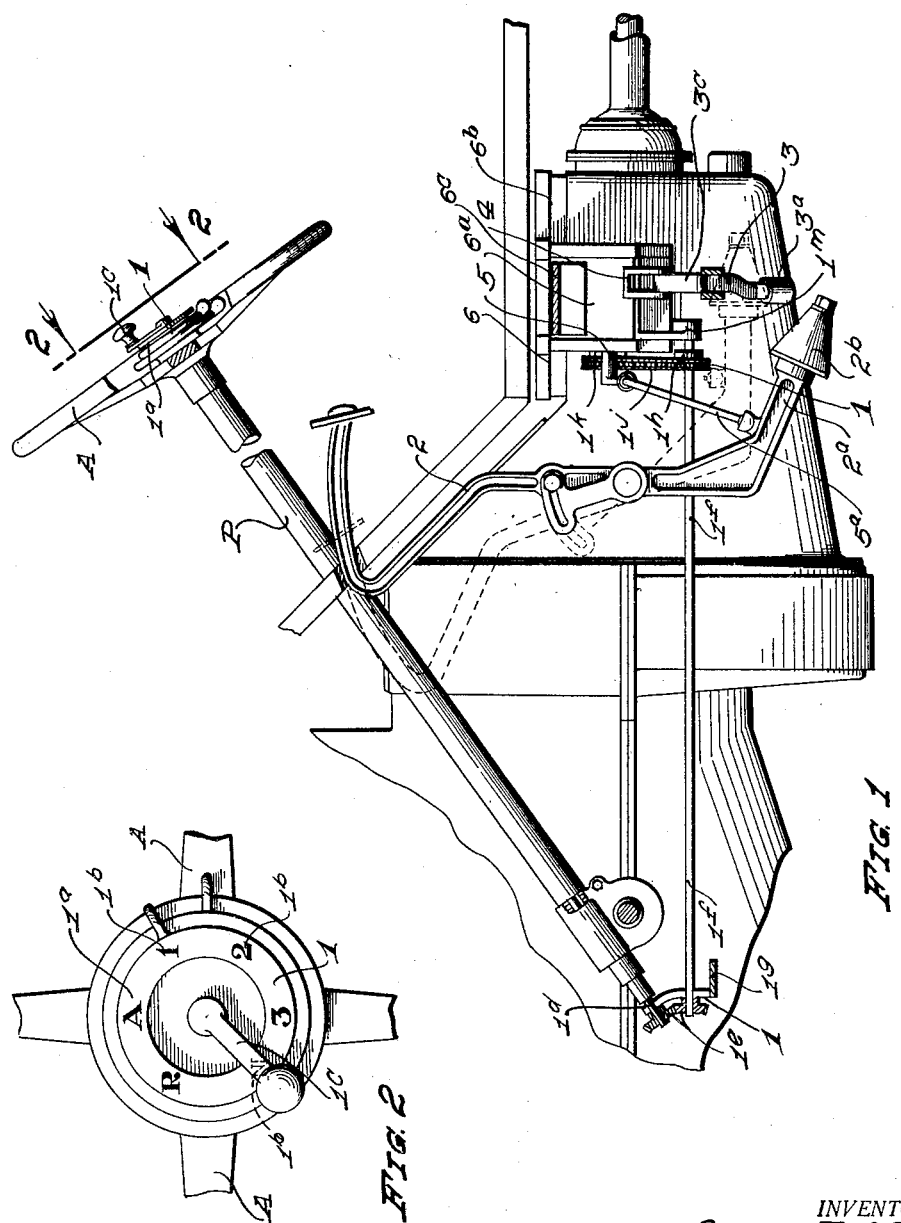
INVENTOR.
OVID E. MARK
BY A.B.Bowman
ATTORNEY

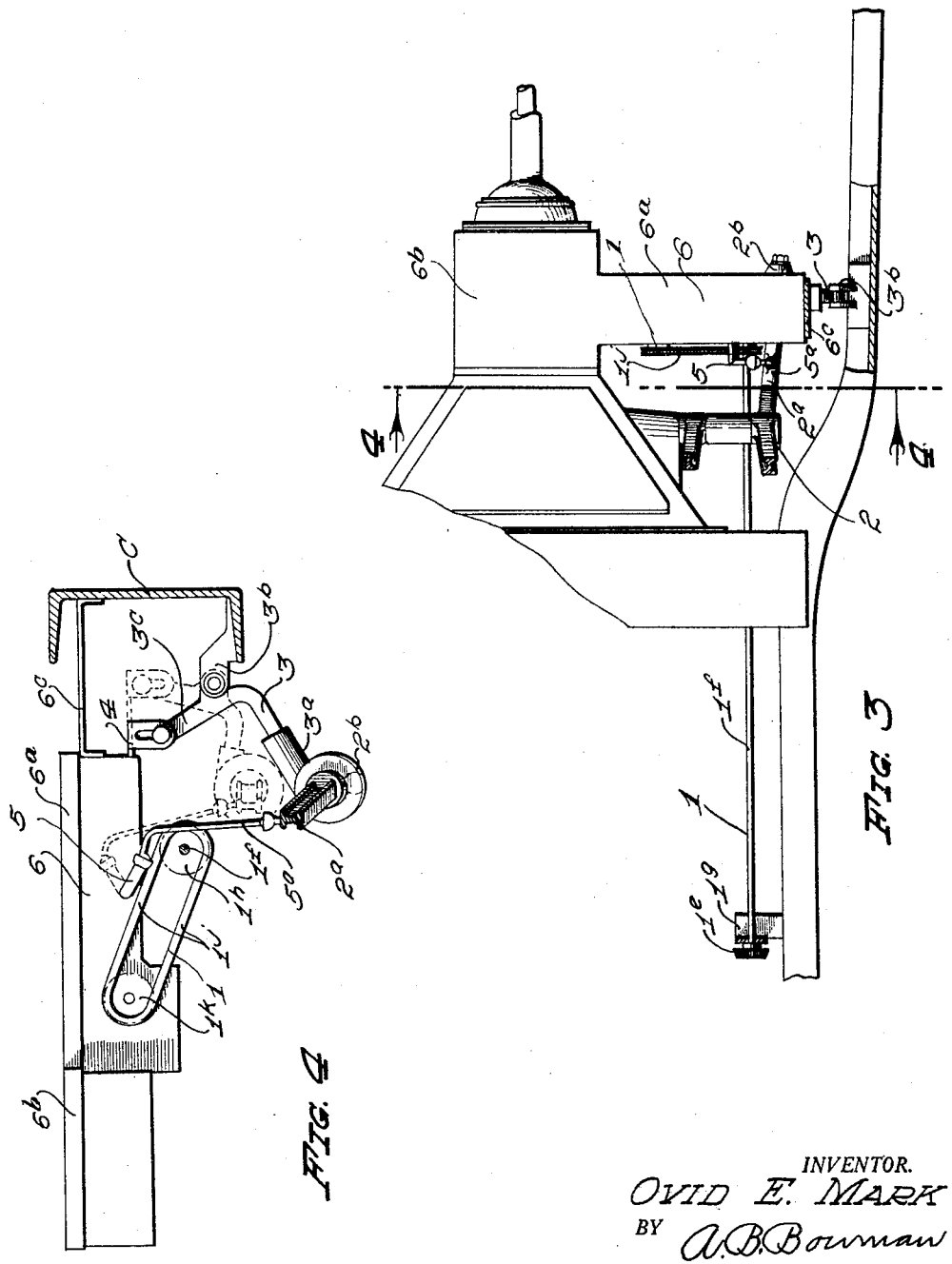

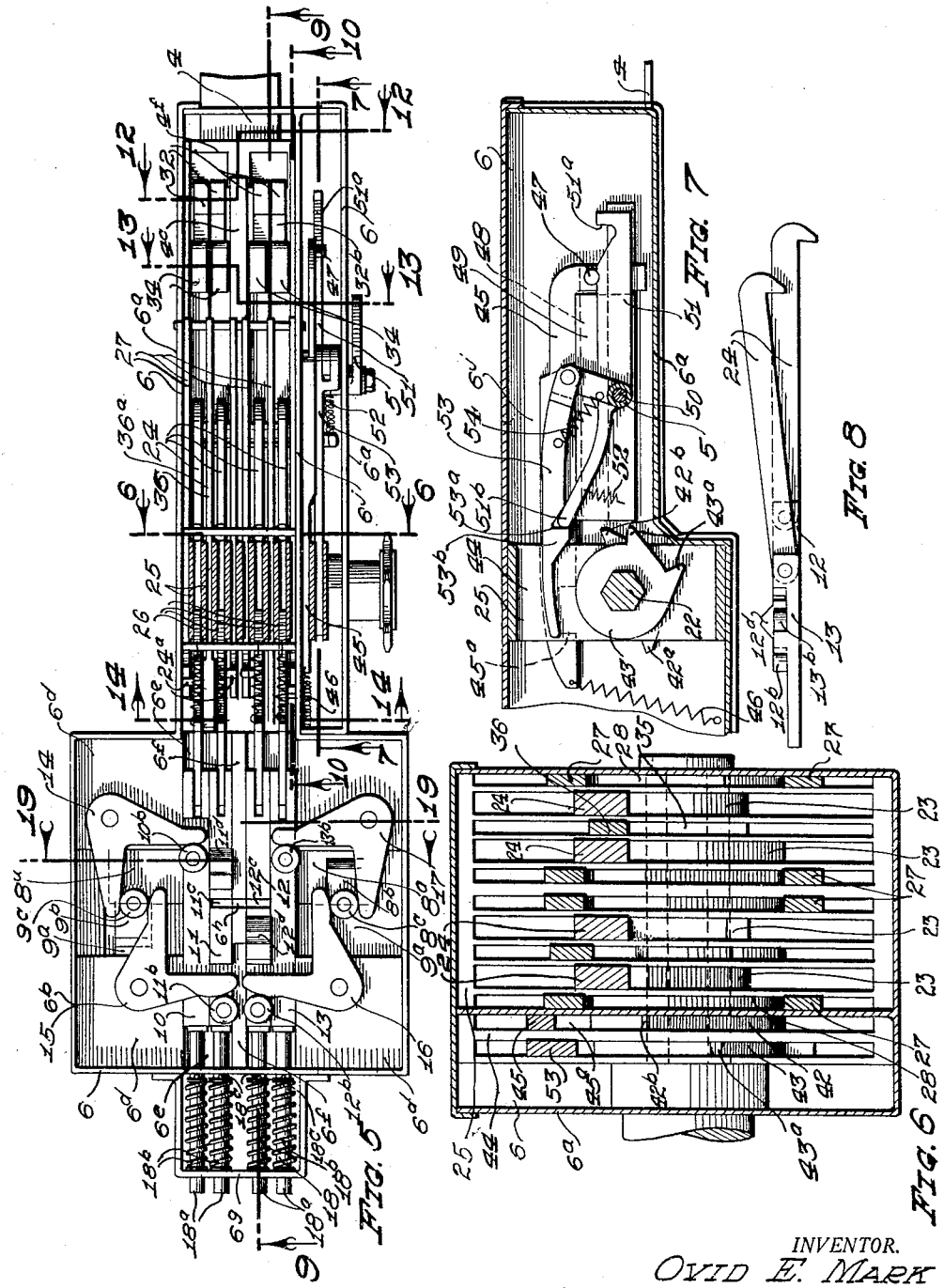

March 11, 1930.  O. E. MARK  1,750,236
GEAR SHIFTING MECHANISM FOR POWER TRANSMISSIONS
Filed May 21, 1928  6 Sheets-Sheet 4
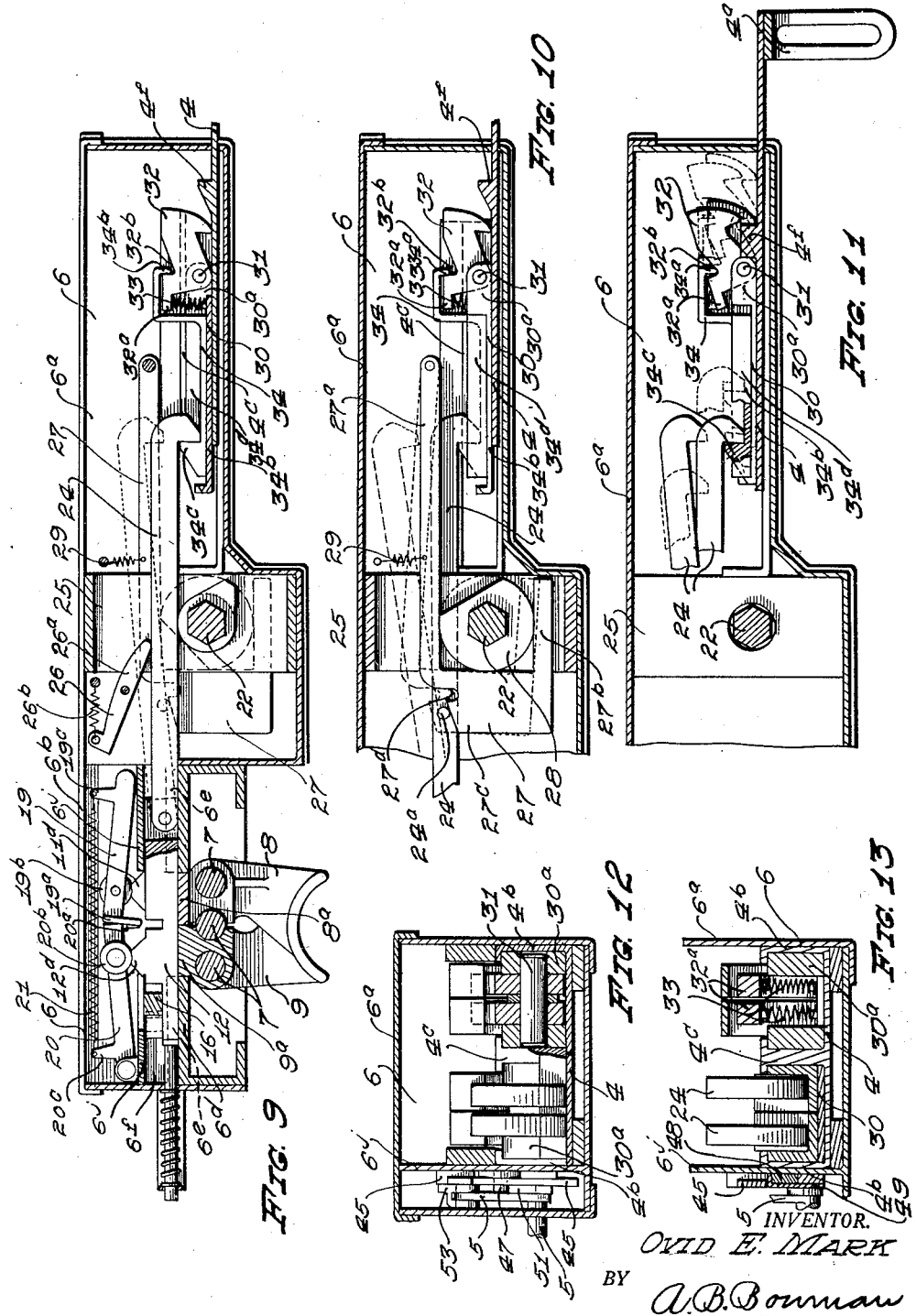
INVENTOR.
OVID E. MARK
BY A. B. Bowman
ATTORNEY March 11, 1930.  O. E. MARK  1,750,236
GEAR SHIFTING MECHANISM FOR POWER TRANSMISSIONS
Filed May 21, 1928   6 Sheets-Sheet 5
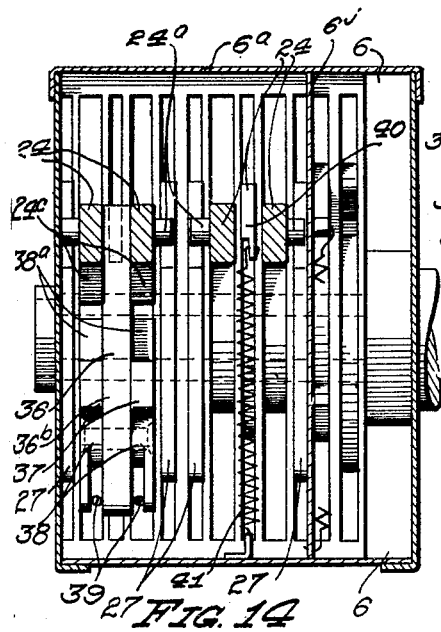
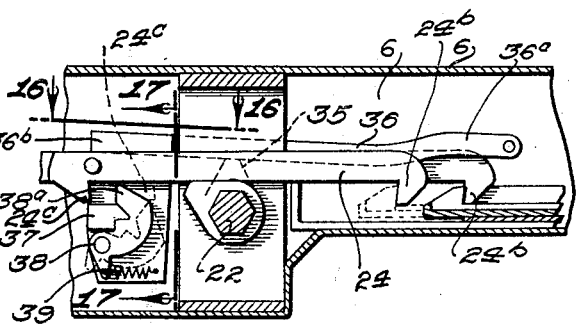
FIG. 15
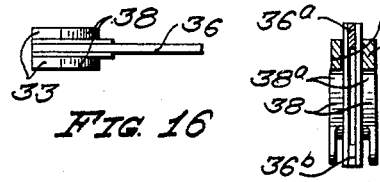
FIG. 16  FIG. 17
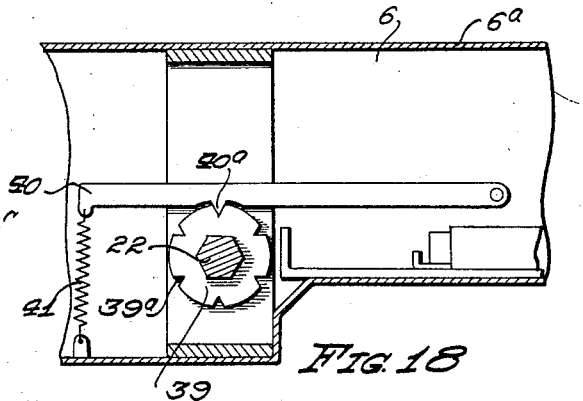
FIG. 18
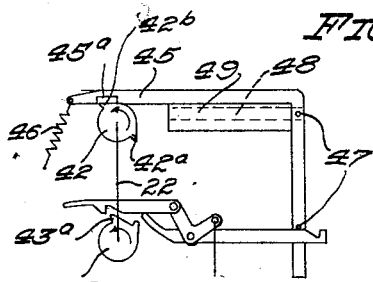
FIG. 20
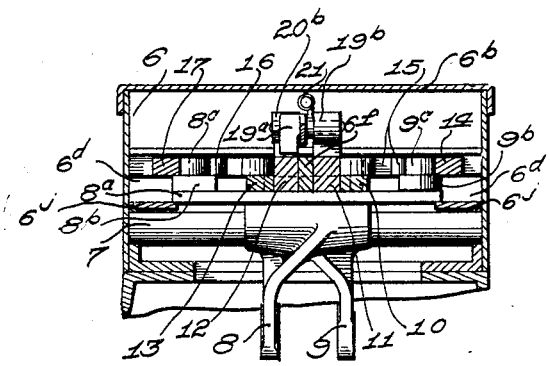
FIG. 19
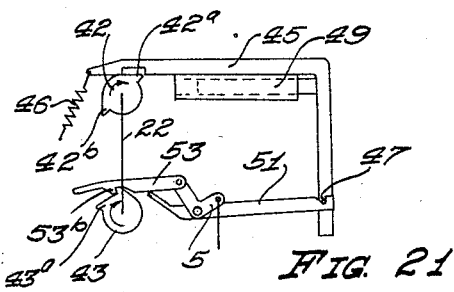
FIG. 21
INVENTOR.
OVID E. MARK
BY
A. B. Bowman
ATTORNEY Patented Mar. 11, 1930

1,750,236

UNITED STATES PATENT OFFICE

OVID E. MARK, OF SAN DIEGO, CALIFORNIA

GEAR-SHIFTING MECHANISM FOR POWER TRANSMISSIONS

Application filed May 21, 1928. Serial No. 279,533.

My invention relates to a gear shifting mechanism particularly adapted for shifting the gears in power transmission mechanism of automotive vehicles and the objects of my invention are: First, to provide a gear shifting mechanism of this class whereby the conventional gear shift lever of automobiles is eliminated; second, to provide a mechanism of this class whereby the gear selection of the transmission mechanism is made at the end of the steering wheel of the vehicle or other places near and handy to the operator of said vehicle; third, to provide a mechanism of this class whereby a gear selection may be made long before the gears of the transmission mechanism are actually shifted or the speed of the direction of the vehicle actually changed; fourth, to provide a mechanism of this class whereby after the gear selection is made on a manually operated selecting means, the gears are shifted in the transmission mechanism by the clutch pedal immediately after it has disconnected the transmission mechanism from the power plant; fifth, to provide a mechanism of this class in which the depression of the clutch pedal both disengages the clutch and shifts the gears of the transmission mechanism; sixth, to provide a gear shifting mechanism whereby the vehicle may be alternately shifted from reverse to low and low to reverse by merely operating the clutch pedal; seventh, to provide a control mechanism of this class which may be so set that the gearing of the transmission mechanism is automatically shifted consecutively from low to intermediate and from intermediate to high speeds by merely operating the clutch or other foot pedal when desiring to change the speed; eighth, to provide a novel gear selecting means for a mechanism of this class; ninth, to provide a transmission gear selecting means whereby only one shifting gear may be moved at one time and whereby said one gear may be moved only after the other shifting gear is locked in neutral position; tenth, to provide a novel means for setting the transmission control mechanism whereby the gears are automatically shifted for consecutively and progressively changing the speed of the vehicle from low to high or from intermediate to high; eleventh, to provide a gear shifting mechanism of this class which may be adapted for transmission mechanisms having more or less than the conventional three speeds, forward and one speed in reverse; twelfth, to provide a gear shifting mechanism which is arranged in units, one unit for each shifting gear of the transmission; thirteenth, to provide as a whole a novelly constructed gear shifting mechanism for automotive vehicle transmissions, and fourteenth, to provide a mechanism of this class which is simple and economical of construction proportional to its functions, durable, efficient, reliable, compact, easy to operate and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of a portion of my gear shifting mechanism with parts and portions broken away and in section to facilitate the illustration; and with adjacent portions of a vehicle shown fragmentarily; Fig. 2 is a fragmentary elevational view from 2—2 of Fig. 1, showing the gear selecting dial and handle therefor; Fig. 3 is a slightly reduced top or plan view of a portion of the gear shifting apparatus with adjacent portions of a vehicle shown fragmentarily and parts and portions in section to facilitate the illustration; Fig. 4 is a slightly enlarged sectional view thereof from 4—4 of Fig. 3; Fig. 5 is an enlarged top or plan view of the main gear shifting mechanism with the cover removed and with parts and portions in section or removed to facilitate the illustration; Fig. 6 is a further enlarged transverse sectional view through 6—6 of Fig. 5; Fig. 7 is a fragmentary sectional view thereof through 7—7 of Fig. 5; Fig. 8 is an elevational view of the intermediate and high shifting catches and slide bars; Fig. 9 is a longitudinal sectional view thereof through 9—9 of Fig. 5 with parts and portions shown in elevation to facilitate the illustration; Fig. 10 is a fragmentary sectional view thereof through 10—10 of Fig. 5 with parts and portions in elevation or removed to facilitate the illustration; Fig. 11 is another fragmentary longitudinal sectional view from the same position as 10—10 with parts and portions removed to facilitate the illustration of the tripping means; Fig. 12 is a fragmentary sectional view through 12—12 of Fig. 5, with parts and portions in elevation to facilitate the illustration; Fig. 13 is a similar transverse sectional view through 13—13 of Fig. 5 with parts and portions removed or shown in elevation to facilitate the illustration; Fig. 14 is an enlarged transverse sectional view through 14—14 of Fig. 5; Fig. 15 is a fragmentary sectional view showing the alternating mechanism and the low and reverse shifting levers with other adjacent portions; Fig. 16 is a fragmentary plane view of the alternating mechanism from the line 16—16 of Fig. 15. Fig. 17 is a sectional view thereof through 17—17 of Fig. 15; Fig. 18 is a fragmentary sectional view showing the ratchet means for stopping the gear selecting mechanism in its proper place; Fig. 19 is a transverse sectional view through 19—19 of Fig. 5 with parts and portions shown in elevation to facilitate the illustration; Figs. 20 and 21 are diagrammatical views of the automatic advancing mechanism in two significant positions; Figs. 22, 23, 24 and 25 are diagrammatical views showing the essential parts and portions when the transmission gear shifting mechanism is in the positions of low, intermediate, high and reverse respectively for a standard transmission.

Similar characters of references refer to similar parts and portions throughout the several views of the drawings.

Selection means 1, clutch lever 2, bell crank 3, slide member 4, bell crank 5, housing 6, support rods 7, shifting fingers 8 and 9. slide bars 10, 11, 12 and 13, V-levers 14, 15, 16 and 17, tensional means 18, lock means 19 and 20, spring 21, shaft 22, catch arm cams 23, catch arms 24, spacing member 25, tension member 26, locking levers 27, locking lever cams 28, springs 29, base members 30, pins 31, catch members 32, springs 33, tripping means 34, alternating mechanism cam 35, alternating mechanism lever 36, stop lugs 37, dog members 38, ratchet wheel 39, pawl 40, spring 41, ratchet wheels 42 and 43, spacing means 44, reciprocating bar 45, spring 46, pin 47, guide bar 48, plate member 49, shaft 50, rocker arm 51, spring 52, pawl 53 and spring 54 constitute the principal parts and portions of my gear shifting mechanism.

A dial $1^a$ of the selection means 1 is preferably mounted on the steering wheel A of a vehicle. As the conventional automotive vehicle has three speeds forward and one reverse the dial $1^a$ is provided with indicia $1^b$, reading "1", "2", "3", representing the low, intermediate and high forward speeds, "N" representing neutral, "R" reverse and "A" alternate. A selection lever $1^c$ is mounted on a rod 1 which extends up through the center of the steering post P.

The lever $1^c$ is connected through the rod $1^d$, gears $1^e$ and a second rod $1^f$ supported by a bracket $1^g$ to a sprocket $1^h$. The sprocket $1^h$ by means of the chain $1^j$ rotates another sprocket $1^k$ which moves the gear shift mechanism as described later. A bracket $1^m$ fastened to the under side of the housing for the gear shift mechanism supports the extended end of the rod $1^f$. The lever $1^c$ thus operates the gear selecting mechanism and indicates the position thereof on the dial 1.

The clutch lever 2 is provided with an extended arm portion $2^a$ projecting downwardly and backwardly from the pivotal point thereof. The extension $2^a$ terminates in a conical engaging member $2^b$ which engages a roller $3^a$ mounted at the one extension of a bell crank 3. The bell crank 3 is secured by means of a bracket $3^b$ to the frame of the automobile as shown best in Fig. 3 of the drawings. The other arm $3^c$ of the bell crank engages a slide member 4 which will be described later. The bell crank 5 which operates the progressive mechanism, which will be described later, extends from the side of the casing which encloses the gear shift mechanism. A connecting rod $5^a$, preferably mounted in ball and socket joints, links the lever 5 with the extension $2^a$ of the clutch 2 as shown best in Figs. 1, 3 and 4 of the drawings.

The housing 6 encloses the working parts of the gear shifting mechanism and consists of a rectangular portion $6^b$ mounted over the transmission of a vehicle in place of the usual gear shifting lever and an extended portion $6^a$ which is supported by a bracket $6^c$ which extends to the frame of the automobile C.

Mounted within the rectangular portion $6^b$ of the housing 6 at the lower side thereof and slidable upon support rods 7 are a pair of shifting fingers 8 and 9. The shifting finger 8 engages the intermediate and high shifting gear, not shown, and the shifting finger 9 is adapted to engage the reverse and low shifting gear, also not shown. The upper portions of the gear shifting fingers 8 and 9 form shifting bars $8^a$ and $9^a$ which are integral with their respective shifting fingers as shown best in Figs. 5, 9 and 18 of the drawings. The lower portion of the casing $6^b$ is provided with a partition $6^d$ having a slot therein which extends lengthwise with the support rods 7 and which receives the two slide bars $8^a$ and $9^a$. The slide bars $8^a$ and $9^a$ terminate in lugs $8^b$ and $9^b$ which extend slightly over the opposite slide bars and are flush with the top surface of the partition $6^d$. A pair of roller members $8^c$ and $9^c$ are mounted at the extremity on the upper surface of the lugs $8^b$ and $9^b$ respectively.

A wide shallow slot $6^e$ is provided in the partition $6^d$ and extends transversely with the shifting bars $8^a$ and $9^a$. The surface of the slot $6^e$ is approximately flush with the upper surfaces of said shifting bars. The slot $6^e$ is divided lengthwise by a partition $6^f$ which extends across the shifting bars $8^a$ and $9^a$.

Four slide bars 10, 11, 12 and 13 are slidably mounted in the slot $6^e$ and are divided into pairs by the partition $6^f$. The one end of each slide bar is bifurcated for pivotally securing a catch arm 24. The two outer slide bars 10 and 13 are provided with rollers $10^b$ and $13^b$ respectively on their upper surface near their bifurcated ends as shown best in Fig. 5 of the drawings. The two inner slide bars 11 and 12 are provided with rollers $11^b$ and $12^b$ respectively mounted near their unbifurcated ends.

The slide bars 10 and 11 are connected to the roller $9^c$ of the shifting bar $9^a$ through a pair of V-levers 14 and 15. The one arm of the V-levers 14 and 15 extends toward each other and engage opposite sides of the rollers $9^c$ while the remaining arm of each V-lever engages its corresponding slide bar roller; V-lever 14 engages roller $10^b$ and V-lever 15 engages roller $11^b$. Similarly the slide bars 12 and 13 are connected through V-levers 16 and 17 to the roller $8^c$ of the shifting bar $8^a$. The one arm of the V-levers 16 and 17 extend toward each other and on opposite sides of the roller $8^c$ while the remaining arm of each V-lever engages its respective slide bar roller; V-lever 16 engages roller $12^b$ and V-lever 17 engages roller $13^b$.

Plunger rods $18^a$ of a tensional means 18, engage the unbifurcated ends of the slide bars 10, 11, 12 and 13, there being one plunger rod for each slide bar. A bracket $6^g$ mounted on the side of the casing $6^a$ supports the extended ends of the said plunger rods. Springs $18^b$ compressed between pins $18^c$ and the end of the bracket $6^g$ tend to hold the plunger rods $18^a$ against their respective slide bars.

Slots $11^c$ and $12^c$ extend transversely across the slide bars 11 and 12 respectively. When in neutral position as shown in Figs. 5 and 9 of the drawings, the slots $11^c$ and $12^c$ are opposite one another and communicate with a slot $6^h$ in the partition $6^f$. Cam portions $11^d$ and $12^d$ are provided on the upper surface of the slide bars 11 and 12 respectively, the cam portion $11^d$ being on the one side of the slot $11^c$ while the cam 12 is on the opposite side of its corresponding slot $12^c$. A second partition $6^j$ extends over the ends of the slide bars 10 to 13 inclusive and over the pivotal portions of the V-levers 14 to 17 inclusive, thereby holding the mechanism in place. Pivotally mounted on the partition $6^j$ and extending toward each other above the partition $6^f$ are a pair of locking means 19 and 20. The extended portions of said bars terminate opposite each other and are provided with lugs $19^a$ and $20^a$ respectively which extend downwardly and away from each other as shown in Figs. 9 and 19 of the drawings.

Rollers $19^b$ and $20^b$ are mounted on the sides of the respective locking arms 19 and 20. When the transmission is in neutral position, roller $19^b$ rests on the cam $11^d$ while roller $20^b$ rests upon cam $12^d$. When in this neutral position the lugs $19^a$ and $20^a$ are held above the slots $12^c$ and $11^c$ respectively. Thus, a movement of the slide bar 11 causes the lug $19^a$ to enter or withdraw from the slot $12^c$ and thereby lock the slide bar 12. Similarly, a movement of the cam $12^d$ and roller $20^b$ locks or unlocks the slide bar 11. A spring 21 stretched between projections $19^c$ and $20^c$, which extend upwardly from their respective locking means holds the rollers $19^b$ and $20^b$ against their respective cams.

The slide bars 10 and 11 control the movement of the slide gears, not shown, which engage the low and reverse speed gears of the transmission, also not shown. When this pair of bars is in neutral position their ends are opposite each other as shown in Fig. 5 of the drawings. The movement of the one slide bar 10 causes an equal and opposite movement of the slide bar 11. Similarly the other pair of slide bars 12 and 13 control the movement of the high and intermediate shifting gears, not shown. In this pair of slide bars also, a movement of one member causes an equal opposite movement of the other member. Thus for every shifting gear of the transmission, there is a pair of slide bars and their operating mechanism.

The sprocket $1^k$ is mounted on a polygonal-shaped shaft 22 which is positioned transversely through the extended portion $6^a$ of the housing 6. A plurality of cam members 23 are positioned on the shaft 22 and are separated from one another by a spacing means 25. The four catch arms 24 which are connected with the slide bars 10, 11, 12 and 13 extend through slots in the spacing means 25 and are engageable with cams 23.

Each catch arm 24 is held against its respective cam 23 by means of a tension member 26 which consists of a centrally pivoted lever $26^a$ mounted above its catch arm and held in tensional contact therewith by means of a spring $26^b$. The maximum points of the cams 23 are so arranged that only one catch arm 24 is raised at any given position of the selection means.

Each catch arm 24 is provided with a locking lever 27 which is operated by a locking lever cam 28 which consists of a circular disk having a flat side. Each locking lever 27 which is substantially J-shaped, is hooked around a cam 28 with its legs $27^a$ and $27^b$ extending approximately horizontal. The longer leg $27^a$ is above the cam 28 and is pivoted at its extremity. The lower and shorter leg $27^b$ is held against the under surface of the cam 28 by means of a spring 29 which is fastened to the longer arm $26^a$ and which pulls upwardly on the locking lever. The cross portion $27^c$ of the locking lever which connects the legs $26^a$ and $26^b$ is provided with a cam surface on its upper side which terminates in a notch $27^d$. Each catch arm 24 is provided with a projection $24^a$ extending from one side thereof which is engageable with the notch $27^d$ when the locking lever 27 is in its raised position and the catch arm 24 is in its forward position.

A tripping means to be described later permits the action of only one pair of catch arms and their corresponding slide bars at one time. The catch lever cams 23 are used one at a time to lift a catch arm out of engagement with the tripping means, to be described later, thereby permitting the forward movement of its mate.

The catch levers 24 engage a tripping mechanism unless raised by one of the cams 23. The tripping means consists of a slide member 4 which projects out through the extended end of the casing and terminates in a depending bifurcated slotted portion $4^a$ which engages the bell crank 3, the other end portion which is within the casing 6 is provided with side walls $4^b$ and a central partition $4^c$. The side walls $4^b$ and partition $4^c$ divide the slide member 4 into two longitudinally extending channels.

A flat base member 30 is mounted in each channel and is slidable relative thereto. The base member 30 terminates in a enlarged bifurcated portion $30^a$. A pin 31 extends transversely through said bifurcated portion and pivotally supports a pair of catch members 32 which are normally in the position shown in Fig. 9 of the drawings. The catch members 32 are engageable with a transversely extending lug $4^f$ which forms a part of the slide member 4. The catch members 32 are normally held against the slide member 4 by means of a spring 33 which is compressed between the base member 30 and a projection $32^a$ which extends from the upper side of the catch members 32 opposite from the catch portion thereof as shown best in Figs. 9 and 13 of the drawings. The upper surface of each catch member is provided with a notched portion $32^b$ which is engageable with a hooked portion $34^a$ of a tripping means 34.

Each tripping means 34 consists of a slide portion $34^b$ which connects said hooked portion with a lug portion $34^c$. The lug portion $34^c$ engages the catch portion of its corresponding catch arm 24. The connecting portion $34^b$ is reinforced by a guide member $34^d$ which is adjacent to the side walls $4^b$ or partitions $4^c$ of the slide member 4. As shown best in Fig. 11 of the drawings, a reciprocal movement of the tripping means 34 causes a pivotal movement of the catch members 32.

The tripping means 34 and catch members 32 are arranged in pairs, a pair for each base member 30 and each pair of slide bars 10 and 11 or 12 and 13. Thus the four units similar to each other are provided, one for each slide bar and a pair for each shifting finger. Each unit consists of one slide bar, its corresponding tension means, its catch arm 24, and the cam 23 therefor, locking lever 27, cam member 28, tripping means 34, catch members 32 and the necessary springs.

Figures 22, 23, 24 and 25 are four diagrammatical views which illustrate respectively the positions of the gear shifting mechanism for low, intermediate, high and reverse speeds of a standard transmission. In these Figs. 22 to 25 inclusive the mechanisms connecting each slide bar are placed one above the other so as to distinguish the movements thereof. The letters "L", "R", "H", and "I" represent respectively the low, reverse, high and intermediate speed positions in the order that they are arranged in the several diagrams. In all four of these diagrammatical views the clutch is assumed to be disengaged and therefore the slide bar 4 is in an extended position.

As shown in Fig. 22, the sliding bar 10 for low position has been pulled forward with the slide bar 4. However the catch member 32 corresponding thereto is in a raised position and out of engagement with the lugs $4^d$. But as the catch members 32 for the low and intermediate shifting mechanisms are on the same pin the catch member of the intermediate mechanism enables the shifting mechanism to move forward with the slide members 4 and thereby pull the bar 10 into the desired position. The low locking lever 27 is raised to engageable position therewith simultaneously with the raising of the reverse catch arm.

Figure 23:
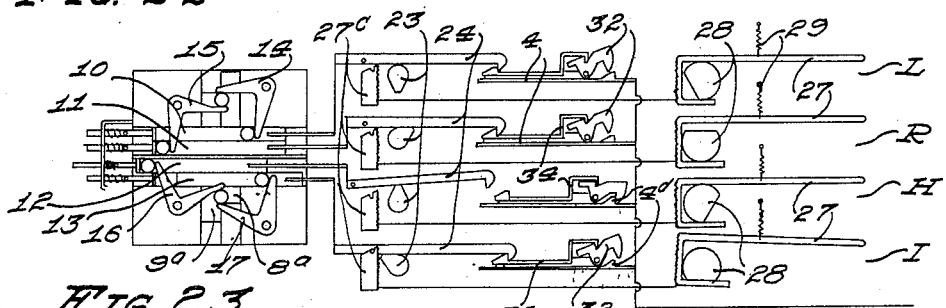
Figure 24:
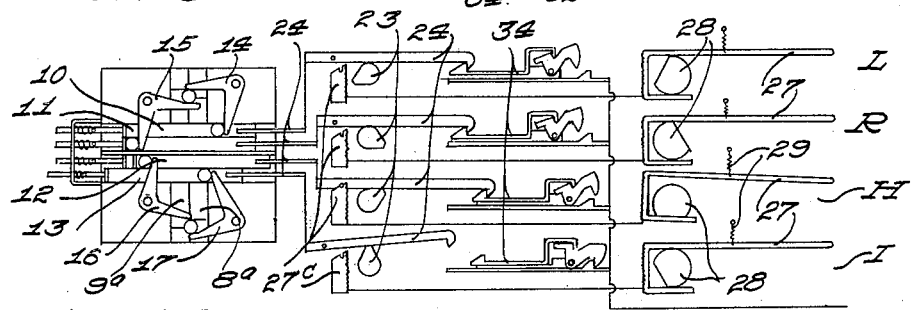
Figure 25:
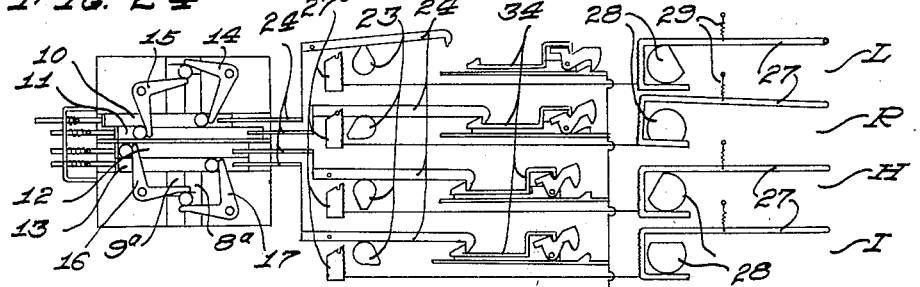

In making the low shift the high and intermediate shifting finger 8 is not used consequently the catch arms 24 for both intermediate and high shifting mechanisms simultaneously engage the tripping mechanism 34 causing it to lift the catch members 34 over the lugs $4^g$ and prevent movement of the slide bars 12 and 13 providing they are already in neutral position. Similarly Fig. 23 shows the position of the various shifting mechanisms when in position for intermediate. In this case the high catch member 32 has remained in engagement with the lug portion $4^d$ thereby pulling the intermediate bar 13 and its intermediate catch arm 24 forward into locking position with its corresponding locking lever 27. In Fig. 24 the transmission is in a high position and the shifting mechanisms for high and intermediate speeds have interchanged their positions. The positions assumed by the shifting mechanisms for the reverse is shown in Fig. 25. In this case shifting mechanisms for low and reverse have interchanged their positions shown in Fig. 22.

If the mechanism should have been in another position besides the neutral when making a shift, for example, if the mechanism had been in low position and it was desired to shift to intermediate, the cams 23 and 28 would be rotated one-sixth of a revolution, thereby causing the high cam 23 to raise the high catch arm and the reverse cam to lower its catch lever thus the slide bars, catch arms and catch members are in the position shown in Fig. 22 while the cam and locking members are in the position shown in Fig. 23. When in this position the reverse catch lever has dropped and is in position for engagement with the tripping means which pulls it forward until the low and reverse gears have moved to neutral position and the slide bars 10 and 11 are parallel with each other.

Continued forward movement of the slide bar causes low and reverse catch arms to trip the catch members therefor, and causes the mechanism to assume the positions shown in Fig. 23. In every case the shifting gear not to be used is moved to neutral position before the other shifting gear is permitted to be shifted.

When the selecting lever 1$^b$ is moved to neutral position none of the catch arms are elevated thus they all engage the tripping mechanism causing the catches 32 to lift over the lugs 4$^g$ after the various slide bars have been moved to neutral position.

An alternating mechanism is provided which causes the shifting finger 9 to move the shifting gears, not shown, into low and then into reverse speed and back to low, as many times as desired. An alternating mechanism cam 35 is mounted between the low and reverse catch arm 23. An L-shaped alternating lever 36 is provided, the longer leg 36$^a$ of which rests upon the cam 35. The shorter leg 36$^b$ depends from the end of the leg 36$^a$ below the catch arms as shown best in Fig. 15 of the drawings. The shorter leg 36$^b$ is provided with a pair of stop lugs 37 one on either side directly under the catch arms 24 for the low and reverse speeds. A pair of dogs 38 are pivotally mounted below the stop lugs 37 with their upper portions 38$^a$ extending slightly above said stop members. Springs 39 hold the dogs 38 against the stop 37 as shown in Fig. 15 of the drawings. Each catch arm 24 for the low and reverse speeds is provided with a depending lug 24$^c$.

When the selection lever 1$^c$ moves opposite the "A" position on the selection dial the alternating cam 35 is raised into engageable position with the low and reverse catch arms.

An extending movement of the reverse and low catch arms 24 causes the corresponding dog 38 to pivot instead of raising said catch lever as shown by dotted lines in Fig. 15 of the drawings. On the return movement the lug 24$^b$ rides over this dog shifting the catch arm 24 clear of the tripping means. First one catch arm and then the other one is lifted over the tripping means thus permitting the gears to be shifted first into low, then into reverse and back to low again as often as the clutch is engaged and disengaged.

A ratchet wheel 39 provided with a plurality of notches 39$^a$ in the periphery thereof is mounted upon the shaft 22 as shown best in Fig. 18 of the drawings. A projection 40$^a$ of a ratchet arm 40 engages the notches in the ratchet wheel 39 and holds the selecting means in the various desired positions, there being one notch for each position. A spring 41 maintains the ratchet arm 40 against the ratchet wheel.

An automatic advancing mechanism is provided which is operated by the movement of the clutch pedal 2 causing the shifting mechanism to move the transmission gears from low to intermediate and from intermediate to high speed without necessitating the manual movement of the selection lever. As shown in Figs. 5, 6, 7 and 14 of the drawings the advancing or progressing mechanism is mounted on a partition 6$^j$ which separates it from the four shifting mechanisms. A pair of ratchet wheels 42 and 43 are mounted on the shaft 22 and are separated from each other by a partition member 44. The ratchet wheel 42 is adjacent to the partition 6$^j$ and is provided with a pair of teeth 42$^a$ and 42$^b$ positioned opposite each other and engage a reciprocating bar 45.

When the shaft 22 is turned clockwise the projection 42$^a$ engages the one side of a slot 45$^a$ provided in the reciprocating bar 45 and moves said bar to the position shown by dotted lines in Fig. 7 of the drawings. Counterclockwise movement of said ratchet wheel 42 engages the opposite side of the slot 45$^a$ and moves the reciprocating bar 45 to the position shown by the solid lines in Fig. 7. Continued movement of the ratchet wheel 42 in either direction causes the reciprocating bar to ride over the projections 42$^a$ or 42$^b$ after the reciprocating bar has once moved to the two positions shown in Fig. 7 in which view the clutch is assumed to be in an engaged position. The reciprocating bar 45 is held against the ratchet wheel 42 by means of a spring 46.

The extended end of the reciprocating bar 45 is pivoted by means of a pin 47 to a guide bar 48 which reciprocates in a guide slot provided in a plate member 49. Pivotally mounted on a shaft 50 is a rocker arm 51, its one end portion extending under the pin 47 which joins the reciprocating bar 45 to the guide bar 48. Movement of the reciprocating bar 45 causes the pin 47 to enter or withdraw from a notch 51$^a$ in the upper surface of the rocker arm 51, causing said rocker arm to pivot slightly about its axis. A spring 52 holds the rocker arm 51 in tensional engagement with the pin 47.

The other extending portion 51$^b$ of the rocker arm 51 projects upwardly and engages a notch 53$^a$ in the under side of a pawl member 53, the one side of the notch 53$^a$ forms the base of a catch portion 53$^b$ which is engageable with the teeth 43$^a$ on the ratchet wheel 43 when in the position shown by dotted lines in the Fig. 7 of the drawings. The pawl 53 is pivotally connected to a bell crank 5 which is rotatably mounted upon the shaft 50 and the one arm of which extends out through the side of the casing 6$^b$ and is connected through the rod 5$^a$ to the clutch pedal extension 2$^a$ as before described. A spring 54 tends to hold the pawl against the upper surface of the ratchet wheel 43 or the extremity 51$^b$ of the rocker arm 51, depending upon the position of said rocker arm.

When the reciprocating bar 45 is in its dotted position the rocker arm 51 permits the pawl 53 to rest on the ratchet wheel 43 where it may engage the pair of teeth 43$^a$ thereon when they are in the proper position.

Referring now to the diagrammatical views, Fig. 20 shows the position of the reciprocating bar with the shaft 22 turned in a counter-clockwise direction. In this position the pin 47 causes the rocker arm 51 to raise the pawl member 53 out of engagement with the ratchet wheel 43. Fig. 21 shows the position of the reciprocating bar when the shaft 22 has been turned in a clockwise direction. In this position the pawl 53 is in engaged position on the ratchet wheel 43. In the Fig. 7 the progressive mechanism is shown in the position assumed after the selection means has been rotated in a counter-clockwise direction and the clutch is in engagement.

In the diagrammatical views, Figs. 20 and 21, the clutch is assumed to be in disengaged position, and the selecting lever is assumed to be pointing at the low speed position of the shifting mechanism. As the clutch is re-engaged after having completed the shift for low speed the pawl 53 engages one of the teeth 43$^a$ and turns the selecting means to the position for intermediate speed but the shift therefore is not completed until the clutch is again disengaged. The act of disengaging the clutch moves the pawl toward the ratchet again and reengagement of the clutch causes the reverse motion, thus moving the selecting means to high position at the same time completing the intermediate shift. A third disengaging and reengaging of the clutch brings the shifting mechanism into high speed.

Thus by rotating the selection lever 1$^b$ clockwise and stopping at the indicia "1" on the dial 1$^a$ which corresponds to the low speed, it is possible by simply working the clutch three times to advance the vehicle from low through intermediate to high speed without manually operating the selection lever. Also it is possible by positioning the selection lever at "2" on the dial 1$^a$ to automatically advance the vehicle from intermediate to high speed. If the dial is turned in the clockwise direction the rocker arm 51 prevents the pawl 53 from engaging the ratchet wheel 43 therefore the vehicle will stay in low or intermediate speed and the clutch may be engaged or disengaged as many times as desired.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secue by Letters Patent is:

1. In a mechanism of the class described, the combination with a clutch lever, a power transmission and gear shifting members therefor, of a pair of slide bars operatively connected to each gear shifting member, a catch arm secured to each of said slide bars, cam means for selecting a predetermined catch arm, trip means engageable with said catch arms for shifting said selected catch arm, link members operatively connecting said trip means with said clutch lever, locking means for securing said selected catch arm in its shifted position, a ratchet and pawl means operatively connected to said clutch lever for rotating said selection cams with a movement of said clutch lever and means for disengaging said pawl from said ratchet.

2. In a mechanism of the class described, the combination with a clutch lever, a power transmission and gear shifting members therefor, of a pair of slide bars operatively connected to each of said gear shifting members, a catch arm secured to each of said slide bars, cam means for selecting a predetermined catch arm, a draw plate operatively connected to said clutch lever, base members slidably mounted thereon, catch members pivotally connected to the one end of each base member, lug portions on said draw plate engageable by said catch members, reciprocating trip means for pivoting each of said catch members out of engagement with said lugs, and one of said catch arms secured to each of said trip members.

3. In a mechanism of the class described, the combination with a clutch lever, a power transmission and gear shifting members therefor, of a pair of slide bars operatively connected to each of said gear shifting members, a catch arm secured to each of said slide bars, cam means for selecting a predetermined catch arm, a draw plate operatively connected to said clutch lever, base members slideably mounted thereon, catch members pivotally connected to the one end of each base member, lug portions on said draw plate engageable by said catch members, reciprocating trip means for pivoting each of said catch members out of engagement with said lugs, one of said catch arms secured to each of said trip members, a ratchet and pawl means operatively connected to said clutch lever for rotating said selection cams with a movement of said clutch lever, and means for disengaging said pawl from said ratchet.

4. In a mechanism of the class described, the combination with a clutch lever, a power transmission and gear shifting members therefor, of a pair of slide bars operatively connected to each gear shifting member, a catch arm secured to each of said slide bars, cam means for selecting a predetermined catch arm, trip means engageable with said catch arms for shifting said selected catch arm, link members operatively connecting said trip means with said clutch lever, locking means for securing said selected catch arm in its shifted position, dog and stop means engageable with said catch arms for alternatingly shifting a shifting gear of said power transmission between two engageable positions thereof.

5. In a mechanism of the class described, the combination with a clutch lever, a power transmission and gear shifting members therefor, of a pair of slide bars operatively connected to each gear shifting member, a catch arm secured to each of said slide bars, cam means for selecting a predetermined catch arm, trip means engageable with said catch arms for shifting said selected catch arm, link members operatively connecting said trip means with said clutch lever, locking means for securing said selected catch arm in its shifted position, a ratchet and pawl means operatively connected to said clutch lever for rotating said selection cams with a movement of said clutch lever, means for disengaging said pawl from said ratchet, and dog and stop means engageable with said catch arms for alternatingly shifting a shifting gear of said power transmission between two engageable positions thereof.

6. In a mechanism of the class described, the combination with a clutch lever, a power transmission and gear shifting members therefor, of a pair of slide bars operatively connected to each of said gear shifting members, a catch arm secured to each of said slide bars, cam means for selecting a predetermined catch arm, a draw plate operatively connected to said clutch lever, base members slidably mounted thereon, catch members pivotally connected to the one end of each base member, lug portions on said draw plate engageable by said catch members, reciprocating trip means for pivoting each of said catch members out of engagement with said lugs, one of said catch arms secured to each of said trip members, and dog and stop means engageable with said catch arm for alternatingly shifting a shifting gear of said power transmission between two engageable positions thereof.

7. In a clutch lever operated gear shifting mechanism for power transmissions, gear shifting fingers, slide bars connected with said gear shifting fingers, catch means secured to said slide bars, selection means for said catch means, a draw plate operated by said clutch lever, base members thereon, hook members pivotally connected to each of said base members and engageable with lugs on said draw plate, reciprocating trip means connecting said catch means with said hook members for disengaging said hook members from the lugs on said draw plate.

8. In a clutch pedal operated gear shifting mechanism for power transmissions, gear shifting fingers, slide bars connected with said gear shifting fingers, catch means connected to said slide bars, selection means for said catch means, a draw plate operated by said clutch pedal, base members thereon, hook members pivotally connected to each of said base members and engageable with lugs on said draw plate, reciprocating trip means connecting said catch means with said hook members for disengaging said hook members from the lugs on said draw plate, ratchet and pawl means connected to said selection means and operated by said clutch pedal for rotating said selection means with a movement of said clutch pedal and means operated by said selection means for disengaging said pawl from said ratchet.

9. In a clutch pedal operated gear shifting mechanism for power transmission, gear shifting fingers, slide bars connected therewith, catch means secured to said slide bars, selection means therefor, a trip mechanism operated by said clutch pedal and connected to said catch means, an alternating mechanism comprising dog members and stop means for limiting the movement of said dog members, said dog members moved into and out of engagement with said catch means by said selection means, said dog members adapted to permit normal movement of said catch means in one direction and to engage said catch means when moved in an opposite direction.

10. In a clutch pedal operated gear shifting mechanism for power transmission, gear shifting fingers, slide bars connected therewith, catch means connected to said slide bars, selection means therefor, a trip mechanism operated by said clutch pedal and connected to said catch means, a consecutive shifting mechanism comprising a pair of ratchet segments, pawl means operated by said clutch pedal and engageable with the one of said ratchet segments for moving said selection means with said clutch pedal, said other ratchet segment operated by said selection means for shifting said pawl members into and out of engagement with said first mentioned ratchet segments.

11. In a clutch pedal operated gear shifting mechanism for power transmission, gear shifting fingers, slide bars connected therewith, catch means secured to said slide bars, selection means therefor, a trip mechanism operated by said clutch pedal and engageable with said selected catch means, an alternating mechanism comprising dog members and stop means for limiting the movement thereof, said dog members moved by said selection means into and out of engagement with said catch means, said dog members adapted to permit normal movement of said catch means in one direction and to engage said catch means when moved in an opposite direction, a pair of ratchet segments, pawl means connected with said clutch pedal and engageable with the one of said ratchet segments for moving said shifting means with said clutch pedal, said other ratchet segment operated by said selection means for shifting said pawl into and out of engagement with the first mentioned ratchet segment.

12. In a gear shifting mechanism in connection with a clutch pedal and a power transmission having a plurality of shifting gears each with two engageable positions and one non-engageable position therebetween, a pair of slide bars connected with each shifting gear for moving said shifting gear in opposite directions, a catch means secured to each of said slide bars, locking means therefor, a tripping means engageable with the catch means of each pair of slide bars, a draw plate connected with said clutch pedal, lugs thereon for engaging said tripping means, means for selecting the catch means for engagement with said tripping means.

13. In a clutch pedal operated gear shifting mechanism for power transmission having a plurality of shifting gears, each with two engageable positions and one non-engageable position therebetween, a pair of slide bars connected with each shifting gear for moving said shifting gear in opposite directions, a catch means secured to each of said slide bars, locking means therefor, a tripping means engageable with the catch means of each pair of slide bars, a draw plate connected with said clutch pedal, lugs thereon for engaging said tripping means, means for selecting the catch means for engagement with said tripping means, a pair of dog members and stop means for limiting the movement thereof, said dog members and stop means shiftable into and out of engagement with the catch members connected with one of said shifting gears, said dog members adapted to disengage said catch arm from said tripping means during a movement in one direction but permitting engagement of said catch arm with said tripping means during movement in an opposite direction.

14. In a clutch pedal operated gear shifting mechanism for power transmission having a plurality of shifting gears each with two engageable positions and one non-engageable position therebetween, a pair of slide bars connected with each shifting gear for moving said shifting gear in opposite directions, a catch means secured to each of said slide bars, locking means therefor, a tripping means engageable with the catch means of each pair of slide bars, a draw plate connected with said clutch pedal, lugs thereon for engaging said tripping means, selection means for shifting said catch means into and out of engagement with said tripping means, means for locking all shifting gears in disengaged position which are not moved into engaged position by said shifting mechanism.

15. In a clutch pedal operated gear shifting mechanism for power transmission having a plurality of shifting gears each with two engageable positions and one non-engageable position therebetween, a pair of catch means connected with each shifting gear for moving said shifting gears in opposite directions, locking levers therefor, a tripping means for each pair of catch means, a draw plate connected with said clutch pedal, lugs thereon for engaging said tripping means, said catch means shiftable into and out of engagement with said tripping means, a pair of dog members and stops for limiting the movement thereof, said dog members and stops shiftable into and out of engagement with the catch members connected with one of said shifting gears, said dog members adapted to disengage said catch arm from said tripping means during a movement in one direction but permitting engagement of said catch arm with said tripping means during the movement in opposite direction, means for locking all shifting gears in disengaged position which are not moved into engaged position by said shifting mechanism.

16. In a clutch pedal operated gear shifting mechanism for power transmission having a plurality of shifting gears each with two engageable positions and one non-engageable position therebetween, a pair of catch members connected with each shifting gear for moving said shifting gear in opposite directions, locking levers therefor, a tripping means engageable with each pair of catch members, a draw plate connected with said clutch pedal, lugs thereon for engaging said tripping means, selection cams for shifting said catch members into and out of engagement with said tripping means, said selection cams mounted on a common shaft, a pair of ratchet segments mounted on said shaft, pawl means connected with the clutch pedal engageable with the one of said ratchet segments for rotating said selection cams, and link means connected with said second mentioned ratchet segments for moving said pawl member into and out of engagement with said first mentioned ratchet segment.

17. In a clutch pedal operated gear shifting mechanism for power transmission having a plurality of shifting gears each with two engageable positions and one non-engageable position therebetween, a pair of catch arms connected with each shifting gear for moving said shifting gear in opposite directions, locking means therefor, a tripping means engageable with each pair of catch arms, a draw plate connected with said clutch pedal, lugs thereon for engaging said tripping means, said catch arms shiftable into and out of engagement with said tripping means, a pair of dog members, stop means therefor, said dog members and stop means shiftable into and out of engagement with a pair of said catch arms connected with one of said shifting gears, said dog members adapted to alternatingly engage members of said pair of catch arms.

18. In a clutch pedal operated gear shifting mechanism for power transmission having a plurality of shifting gears, each with two engageable positions and one non-engageable position therebetween, a pair of catch arms connected with each shifting gear for moving said shifting gear in opposite directions, locking means therefor, a tripping means engageable with each pair of catch arms, a draw plate connected with said clutch pedal, lugs thereon for engaging said tripping means, selection cams for shifting said catch arms into and out of engagement with said tripping means, a common shaft for said selection cams, a pair of ratchet segments mounted on said shaft, pawl means connected with the clutch pedal engageable with the one of said ratchet segments for rotating said selection cams, links means connected with said second mentioned ratchet segment for moving said pawl member into and out of engagement with said first mentioned ratchet segment.

In testimony whereof, I have hereunto set my hand at San Diego, California, this 6th day of April, 1928.

OVID E. MARK.